(12) United States Patent
Tomita

(10) Patent No.: US 8,099,612 B2
(45) Date of Patent: Jan. 17, 2012

(54) INFORMATION PROCESSING APPARATUS

(75) Inventor: Nobuyoshi Tomita, Kanagawa (JP)

(73) Assignee: Sony Corporation (JP)

( * ) Notice: Subject to any disclaimer, the term of this patent is extended or adjusted under 35 U.S.C. 154(b) by 399 days.

(21) Appl. No.: 12/378,755

(22) Filed: Feb. 19, 2009

(65) Prior Publication Data

US 2009/0217063 A1 Aug. 27, 2009

(30) Foreign Application Priority Data

Feb. 21, 2008 (JP) .............................. P2008-039594

(51) Int. Cl.
*G06F 1/26* (2006.01)
(52) U.S. Cl. ....................................................... 713/310
(58) Field of Classification Search .................. 713/310
See application file for complete search history.

(56) References Cited

U.S. PATENT DOCUMENTS

| | | | |
|---|---|---|---|
| 5,802,305 A * | 9/1998 | McKaughan et al. | 709/227 |
| 5,915,119 A * | 6/1999 | Cone | 713/310 |
| 6,311,276 B1 | 10/2001 | Connery et al. | |
| 7,260,729 B2 | 8/2007 | Araki | |
| 7,549,067 B2 * | 6/2009 | Tolliver | 713/320 |
| 7,555,662 B2 * | 6/2009 | Kidoguchi | 713/323 |
| 7,757,105 B2 * | 7/2010 | Okazaki | 713/300 |
| 7,899,923 B2 * | 3/2011 | Siegmund | 709/230 |

FOREIGN PATENT DOCUMENTS

| | | |
|---|---|---|
| JP | 04170690 A | 6/1992 |
| JP | 2004252602 A | 9/2004 |
| JP | 2005-062955 A | 3/2005 |
| JP | 2007183797 A | 7/2007 |
| JP | 2007201559 A | 8/2007 |

OTHER PUBLICATIONS

Office Action from Japanese Application No. 2008-039594, dated Feb. 15, 2011.
Office Action from Japanese Application No. 2008-039594, dated Mar. 9, 2010.

* cited by examiner

*Primary Examiner* — Glenn A Auve
(74) *Attorney, Agent, or Firm* — Lerner, David, Littenberg, Krumholz & Mentlik, LLP

(57) ABSTRACT

An information processing apparatus includes: a data processing unit configured to perform predetermined data processing; a power supply circuit having a first operation mode in which power is supplied to the data processing unit and a second operation mode in which no power is supplied to the data processing unit; and a mode switching control unit configured to, upon receiving a mode switching request from an apparatus on a network via a communication protocol of a communication protocol layer higher than the network access layer, instruct the power supply circuit to switch between the first operation mode and the second operation mode in response to the mode switching request.

8 Claims, 10 Drawing Sheets

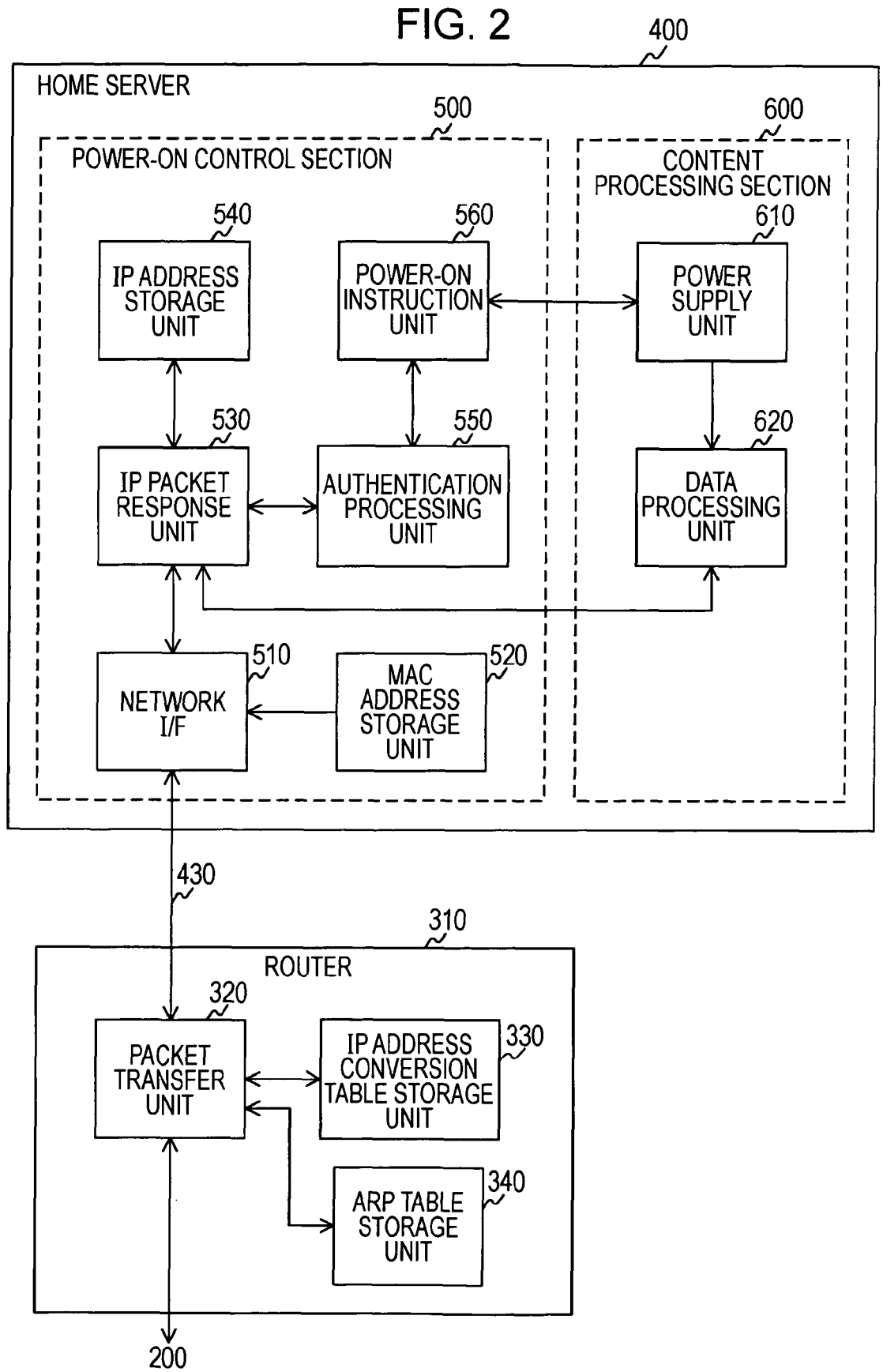

|  | 332 INTERNET SIDE | | 333 TERMINAL SIDE | |
| --- | --- | --- | --- | --- |
|  | IP ADDRESS | PORT NUMBER | IP ADDRESS | PORT NUMBER |
| 334 | IP ADDRESS 371 | PORT NUMBER 381 | IP ADDRESS 451 | PORT NUMBER 461 |
| 335 | IP ADDRESS 371 | PORT NUMBER 382 | IP ADDRESS 452 | PORT NUMBER 461 |
| 336 | IP ADDRESS 371 | PORT NUMBER 383 | IP ADDRESS 453 | PORT NUMBER 461 |

| MAC ADDRESS | IP ADDRESS |
| --- | --- |
| MAC ADDRESS 441 | IP ADDRESS 451 |
| MAC ADDRESS 442 | IP ADDRESS 452 |
| MAC ADDRESS 443 | IP ADDRESS 453 |

POST /power_on HTTP/1.1

Host : homeserver.myhome.chomechome.com

HTTP/1.1 200 OK

Date : Wed, 19 Mar 2005 19:45:00 JST

INFORMATION PROCESSING APPARATUS

CROSS REFERENCES TO RELATED APPLICATIONS

The present application claims priority from Japanese Patent Application No. JP 2008-039594, filed in the Japanese Patent Office on Feb. 21, 2008, the entire content of which is incorporated herein by reference.

BACKGROUND OF THE INVENTION

1. Field of the Invention

The present invention relates to information processing apparatuses, and, more particularly, to an information processing apparatus and an information processing method for switching between a plurality of operation modes of different power consumptions in response to a request transmitted from an apparatus on a network and a program causing a computer to perform the information processing method.

2. Description of the Related Art

There is a technique called Wake on LAN (WOL) allowing a remote control apparatus to turn on a specific apparatus via a network. Magic Packet is a famous WOL technique developed by AMD (Advanced Micro Devices) Inc. In this WOL technique, for example, a WOL packet obtained by setting the MAC (Media Access Control) address of a target apparatus for a specific type of packet or a packet including specific data is transmitted. The target apparatus in a standby mode detects the WOL packet and is turned on. For example, such a technique is used to turn on a server connected to an intra-company LAN (Local Area Network).

As enhanced usage of WOL, for example, a case can be assumed in which a user away from the home turns on a home server via the Internet and makes a reservation of a program to be recorded. In this case, if the general setting of an in-home LAN is performed, a WOL packet transmitted via the Internet is discarded by a broadband router disposed at an entrance of a home server system. Therefore, it is necessary to perform a setting called port forwarding for the broadband router so as to convert a destination IP (Internet Protocol) address and a port number (on a WAN) included in the WOL packet transmitted via the Internet into a home server IP address and a home server port number (on a LAN), respectively. As a result, the broadband router can convert the destination IP address and the port number (on a WAN) included in the WOL packet into the home server IP address and the home server port number (on a LAN). However, in order to transfer the WOL packet to the home server, it is necessary to specify the MAC address of the home server that is the destination of the WOL packet. If the broadband router stores an ARP (Address Resolution Protocol) table in which an IP address and a MAC address are associated with each other, it acquires the MAC address of the home server that is the destination of the WOL packet using the ARP table and transfers the WOL packet. However, in general, such a broadband router periodically performs automatic updating of LAN setting so as to respond to changes in LAN configuration which are caused by, for example, the actuation or shutdown of an apparatus connected thereto. In the updating of LAN setting, the broadband router erases ARP table information after a predetermined period has elapsed. In this case, it is difficult for the broadband router to acquire the MAC address of the home server and transfer the WOL packet to the home server.

In this WOL technique, if the authentication of a packet to be transmitted to an apparatus via a network such as the Internet is not performed, a malicious user may turn on the apparatus. This compromises the security of the apparatus. A WOL technique that includes an authentication function as an additional function has been proposed. For example, a method of performing the authentication of an apparatus at the time of receiving a WOL packet from the apparatus and turning on a target apparatus only when the apparatus is authenticated is disclosed (see, for example, Japanese Unexamined Patent Application Publication No. 2005-062955 (FIG. 13) and U.S. Pat. No. 6,311,276 (FIG. 3)).

SUMMARY OF THE INVENTION

In the above-described techniques in the related art, since the authentication of an apparatus from which a WOL packet has been transferred is performed before a target apparatus is turned on, it is possible to turn on the target apparatus with safety. However, since ARP table information of a broadband router is erased, it is difficult for the target apparatus in a standby mode to receive the WOL packet and turn the power on.

It is desirable to allow a remote control apparatus on a network to turn on a target apparatus in a standby mode using a general broadband router with safety and certainty without providing unnecessary additional functions for the target apparatus.

An information processing apparatus according to an embodiment of the present invention includes: data processing means for performing predetermined data processing; a power supply circuit having a first operation mode in which power is supplied to the data processing means and a second operation mode in which no power is supplied to the data processing means; and mode switching control means for, upon receiving a mode switching request from an apparatus on a network via a communication protocol of a communication protocol layer higher than the network access layer, instructing the power supply circuit to switch between the first operation mode and the second operation mode in response to the mode switching request. In an information processing apparatus according to an embodiment of the present invention, a mode switching request can be received from an apparatus on a network via a communication protocol of a communication protocol layer higher than the network access layer. In response to the mode switching request, a power supply circuit can perform the switching between a first operation mode and a second operation mode. In a case that the power supply circuit is in the second operation mode, upon receiving the mode switching request, the mode switching control means may instruct the power supply circuit to change the second operation mode to the first operation mode in response to the mode switching request. As a result, if the power supply circuit supplies no power to the data processing means, power can be supplied to the data processing means in response to a mode switching request transmitted from an apparatus on a network.

In an information processing apparatus according to an embodiment of the present invention, the mode switching control means may include authentication processing means for, upon receiving an authentication request from the apparatus on the network via the communication protocol of the communication protocol layer higher than the network access layer in a case that the power supply circuit is in the second operation mode, performing authentication of the apparatus. As a result, if the power supply circuit supplies no power to the data processing means, the authentication of the apparatus can be performed in response to an authentication request transmitted from an apparatus on a network via a communication protocol of a communication protocol layer higher than the network access layer.

In an information processing apparatus according to an embodiment of the present invention, the mode switching control means may include first address storing means for storing a first address that is unique address information for the information processing apparatus, second address storing means for storing a second address that is network address information of the information processing apparatus, and packet responding means for, upon receiving a packet for inquiry about the first address in a case that the power supply circuit is in the second operation mode, transmitting a response packet storing a relationship between the first address and the second address to an apparatus from which the packet has been transmitted. As a result, even if the power supply circuit supplies no power to the content processing means, a response packet storing the relationship between a first address and a second address of the information processing apparatus can be transmitted to an apparatus from which a packet for inquiry about the first address information of the information processing apparatus has been transmitted. The first address may be a MAC address, and the second address may be an IP address. As a result, a response packet storing the relationship between the MAC address and the IP address of the information processing apparatus can be transmitted to an apparatus from which a packet for inquiry about the MAC address of the information processing apparatus has been transmitted.

An information processing system according to an embodiment of the present invention includes: an information processing apparatus; and a path control apparatus. The information processing apparatus includes: data processing means for performing predetermined data processing; a power supply circuit having a first operation mode in which power is supplied to the data processing means and a second operation mode in which no power is supplied to the data processing means; and mode switching control means for, upon receiving a mode switching request from an apparatus on a network via a communication protocol of a communication protocol layer higher than the network access layer, instructing the power supply circuit to switch between the first operation mode and the second operation mode in response to the mode switching request. The path control apparatus is an apparatus for transferring a packet for the mode switching request to the information processing apparatus. The path control apparatus transmits a packet for inquiry about unique address information for the information processing apparatus. In a case that the power supply circuit is in the second operation mode, upon receiving the packet for inquiry about unique address information for the information processing apparatus, the mode switching control means transmits to the path control apparatus the unique address information for the information processing apparatus. As a result, if the power supply circuit supplies no power to the data processing means, the information processing apparatus can transmit unique address information for the information processing apparatus to the path control apparatus in response to an inquiry about unique address information for the information processing apparatus.

A mode switching method according to an embodiment of the present invention is for an information processing apparatus that includes data processing means for performing predetermined data processing and a power supply circuit having a first operation mode in which power is supplied to the data processing means and a second operation mode in which no power is supplied to the data processing means. The mode switching method includes the steps of: receiving a mode switching request from an apparatus on a network via a communication protocol of a communication protocol layer higher than the network access layer; and instructing the power supply circuit to switch between the first operation mode and the second operation mode in response to the mode switching request. A program according to an embodiment of the present invention causes a computer to perform the above-described mode switching method. As a result, upon receiving a mode switching request from an apparatus on a network via a communication protocol of a communication protocol layer higher than the network access layer, a power supply circuit can perform the switching between a first operation mode and a second operation mode.

According to an embodiment of the present invention, it is possible to allow a remote control apparatus on a network to turn on a target apparatus in a standby mode using a general broadband router with safety and certainty without providing unnecessary additional functions for the target apparatus.

BRIEF DESCRIPTION OF THE DRAWINGS

FIG. 2 is a block diagram illustrating exemplary functional configurations of a router and a home server according to an embodiment of the present invention;

DESCRIPTION OF THE PREFERRED EMBODIMENTS

Embodiments of the present invention will be described in detail below with reference to the accompanying drawings.

Figure 1:
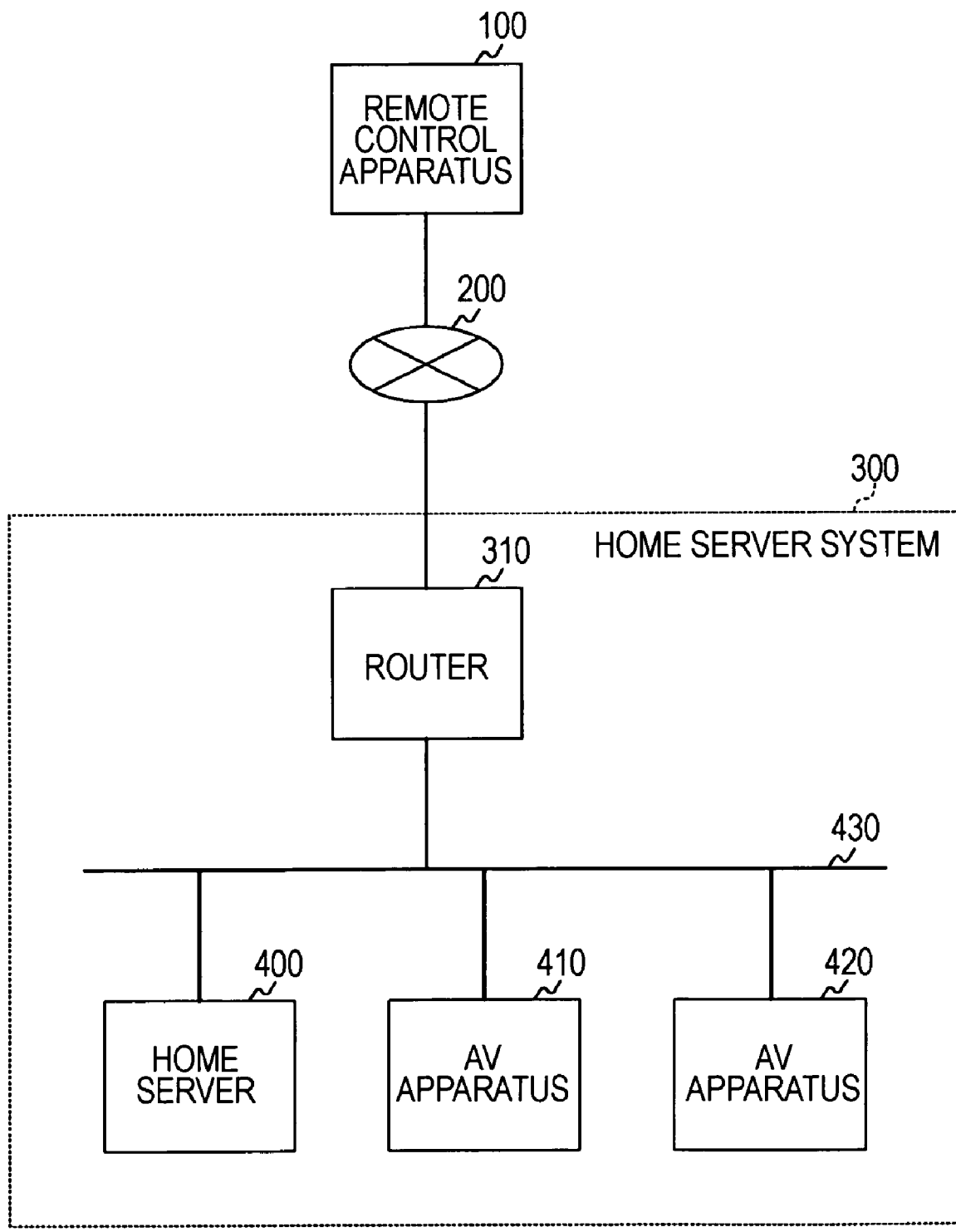
FIG. 1 is a block diagram illustrating an exemplary configuration of a home server system according to an embodiment of the present invention.

FIG. 1 is a block diagram illustrating an exemplary configuration of a home server system according to an embodiment of the present invention. Referring to FIG. 1, a remote control apparatus 100 and a home server system 300 are connected to each other via the Internet 200. The home server system 300 includes a router 310, a home server 400, AV (Audio Visual) apparatuses 410 and 420, and a LAN 430. In the home server system 300, the router 310, the home server 400, and the AV apparatuses 410 and 420 are connected to each other via the LAN 430.

The remote control apparatus 100 accesses the home server 400 in a standby mode via the Internet 200 so as to transmit a power-on request to the home server 400. More specifically, the remote control apparatus 100 transmits to the home server 400 in the standby state an authentication request packet and authentication information necessary for the authentication thereof. If the authentication of the remote control apparatus 100 is successfully completed in the home server 400, the remote control apparatus 100 transmits a power-on request packet to the home server 400. The remote control apparatus 100 can be implemented by use of a mobile telephone or a personal computer.

The router 310 connects the Internet 200 and the LAN 430. The manual setting of port forwarding or the automatic setting of port forwarding by the UPnP (Universal Plug and Play) IGD (Internet Gateway Device) function is performed in advance for the router 310. The router 310 transfers a specific packet transmitted via the Internet 200 to the LAN 430. UPnP is a function of allowing an apparatus connected to a network and an apparatus on the network to recognize each other and automatically perform a predetermined setting operation. UPnP IGD is a UPnP function for a broadband router.

The home server 400 collectively manages pieces of content of the AV apparatuses 410 and 420 on the LAN 430. The home server 400 has a normal mode and a standby mode. In the normal mode, the home server 400 supplies power to all units included therein. In the standby mode, the home server 400 supplies power to some of all the units so as to reduce power consumption. In the standby mode, upon receiving an authentication request packet from the remote control apparatus 100, the home server 400 performs the authentication of the remote control apparatus 100. If the authentication of the remote control apparatus 100 is successfully completed, the home server 400 in the standby mode receives a power-on request packet from the remote control apparatus 100 and turns the power on. As a result, in the home server 400, the standby mode is changed to the normal mode.

Each of the AV apparatuses 410 and 420 is an apparatus allowing a user to view content managed by the home server 400.

FIG. 2 is a block diagram illustrating exemplary functional configurations of the router 310 and the home server 400 according to an embodiment of the present invention. A case will be described in which the router 310 receives a packet transmitted from the remote control apparatus 100 via the Internet 200 and transfers the received packet to the LAN 430.

The router 310 includes a packet transfer unit 320, an IP (Internet Protocol) address conversion table storage unit 330, and an ARP (Address Resolution Protocol) table storage unit 340.

The IP address conversion table storage unit 330 associates the IP address and the port number of the router 310 on the side of a WAN (Wide Area Network), that is, the Internet 200, with the IP address and the port number of a specific apparatus included in the home server system 300 (for example, the home server 400), and stores them.

The ARP table storage unit 340 stores the relationship between the IP address and the MAC (Media Access Control) address of each terminal on the LAN 430, for example, the home server 400.

In the ARP table storage unit 340, the IP address and the MAC address of the home server 400 are associated with each other and are then stored. However, information stored in the ARP table storage unit 340 is erased on a periodic basis. The reason for this is that when each terminal, for example, the home server 400, is turned off or the IP address of the home server 400 is manually changed, the relationship between the IP address and the MAC address of the home server 400 which is stored in the ARP table storage unit 340 does not match the relationship between the changed IP address and the MAC address of the home server 400.

The packet transfer unit 320 transfers a packet transmitted via the Internet 200 to the LAN 430 on the basis of the relationship that is stored in the IP address conversion table storage unit 330 at the time of the setting of port forwarding. For example, if the IP address and the port number of a packet transmitted via the Internet 200 matches the IP address and the port number stored in the IP address conversion table storage unit 330, the packet transfer unit 320 converts the IP address and the port number of the packet into the IP address and the port number of the home server 400.

Furthermore, the packet transfer unit 320 sets the MAC address of the home server 400 as the destination MAC address of the packet converted using the port forwarding function. For example, if information stored in the ARP table storage unit 340 is not erased, the packet transfer unit 320 acquires a MAC address corresponding to the IP address of the home server 400 using the information stored in the ARP table storage unit 340, and sets the acquired MAC address as the destination MAC address of the packet converted using the port forwarding function. On the other hand, if the information stored in the ARP table storage unit 340 is erased, the packet transfer unit 320 transmits an ARP request packet so as to inquire about the MAC address of the home server 400. The packet transfer unit 320 receives an ARP response packet from the home server 400, thereby acquiring the MAC address of the home server 400. The packet transfer unit 320 sets the acquired MAC address of the home server 400 as the destination MAC address of the packet transmitted via the Internet 200, and transfers the packet to the LAN 430.

Thus, the router 310 converts the IP address and the port number of the packet transmitted via the Internet 200 into the IP address and the port number of the home server 400, sets the MAC address of the home server 400 for the packet, and transfers the packet to the LAN 430.

The home server 400 includes a power-on control section 500 and a content processing section 600 that includes a power supply unit 610 and a data processing unit 620. In the standby mode of the home server 400, the power-on control section 500 receives an authentication request packet from the remote control apparatus 100, and performs the authentication of the remote control apparatus 100 in response to the authentication request packet. If the authentication of the remote control apparatus 100 is successfully completed, the power-on control section 500 transmits a power-on instruction in response to a power-on request packet transmitted from the remote control apparatus 100. The content processing section 600 turns the power on in accordance with the power-on instruction transmitted from the power-on control section 500 and performs predetermined data processing. As described previously, two operation modes of the home server 400 are assumed. More specifically, there are a standby mode in which power is supplied to only the power-on control section 500 and a normal mode in which power is supplied to both of the power-on control section 500 and the data processing unit 620. Accordingly, the supply of power to the data processing unit 620 in accordance with the power-on instruction transmitted from the power-on control section 500 means the change from the standby mode to the normal mode in the home server 400.

The power-on control section 500 includes a network interface (I/F) 510, a MAC address storage unit 520, an IP packet response unit 530, an IP address storage unit 540, an authentication processing unit 550, and a power-on instruction unit 560. In order to reduce the power consumption of the home server 400 in the standby mode, the power-on control section 500 includes the minimum necessary function. In the standby mode of the home server 400, power is not supplied to a hard disk drive and a liquid crystal display panel (including an LED (Light-Emitting Diode)) which are included in the home server 400.

The MAC address storage unit 520 stores the MAC address of the home server 400 as unique address information for each apparatus.

The network interface 510 receives a packet transferred from the router 310 on the basis of a MAC address stored in the MAC address storage unit 520. The network interface 510 supplies the received packet to the IP packet response unit 530. For example, if the destination MAC address of the packet received by the network interface 510 matches a MAC address stored in the MAC address storage unit 520 or is a broadcast address, the network interface 510 supplies the received packet to the IP packet response unit 530. Furthermore, the network interface 510 converts the data of a packet supplied form the IP packet response unit 530 into an electric signal and transmits the electric signal to the LAN 430.

The IP address storage unit 540 stores the IP address of the home server 400 as network address information.

The IP packet response unit 530 handles ARP that is one of communication protocols such as IP (Internet Protocol) of the Internet layer. For example, the IP packet response unit 530 determines whether a packet supplied from the network interface 510 is an ARP request packet transmitted from the router 310. If the packet is an ARP request packet, the IP packet response unit 530 determines whether an inquiry IP address set for the ARP request packet is the same as an IP address stored in the IP address storage unit 540. If the inquiry IP address is the same as the IP address stored in the IP address storage unit 540, the IP packet response unit 530 transmits to the router 310 (from which the ARP request packet has been transmitted) an ARP response packet storing the relationship between the IP address stored in the IP address storage unit 540 and the MAC address stored in the MAC address storage unit 520. If the inquiry IP address is different from the IP address stored in the IP address storage unit 540, the IP packet response unit 530 discards the ARP request packet. If the packet supplied from the network interface 510 is an authentication request packet, an authentication information packet, or a power-on request packet, the IP packet response unit 530 transfers the packet to the authentication processing unit 550.

Under the assumption that an IP address is assigned to a terminal connected to the LAN 430, for example, the home server 400, using the DHCP function, a function of generating a UPnP message when an IP address stored in the IP address storage unit 540 is changed and transmitting the generated UPnP message indicating that the IP address stored in the IP address storage unit 540 has been changed to the router 310 may be provided for the IP packet response unit 530. As a result, upon receiving the UPnP message transmitted from the IP packet response unit 530, the router 310 corrects the IP address on the side of the LAN 430 which is stored in the IP address conversion table storage unit 330 so as to transfer the packet transmitted from the remote control apparatus 100 to the home server 400. The UPnP message is a message that is generated in accordance with specifications proposed by Microsoft Corporation for the purpose of exchanging information between terminals such as a router and an AV apparatus.

A case has been described in which the IP address of the router 310 on the side of the LAN 430 is changed. However, a case can be considered in which the IP address of the router 310 on the side of the Internet 200 is changed. In this case, the router 310 transmits a UPnP change message indicating that the IP address thereof on the side of the Internet 200 has been changed to the LAN 430 without correcting the IP address thereof on the side of the Internet 200 in the IP address conversion table storage unit 330. The IP packet response unit 530 detects the change message transmitted from the router 310 and transmits to the router 310 a UPnP correction message requesting for the correction of the IP address of the router 310 on the side of the Internet 200 in the IP address conversion table storage unit 330. Upon receiving the correction message from the IP packet response unit 530, the router 310 can correct the IP address thereof on the side of the Internet 200 in the IP address conversion table storage unit 330 and transfer the packet transmitted from the remote control apparatus 100 to the home server 400. Here, a case is assumed in which the IP address of the router 310 on the side of the Internet 200 is changed by the system of a provider each time the router 310 is connected to the Internet 200.

The authentication processing unit 550 selects the authentication request packet transmitted from the remote control apparatus 100 from among packets received from the IP packet response unit 530, and performs authentication processing on the basis of the authentication request packet. For example, the authentication processing unit 550 may have an HTTPS server function so as to function as a dedicated authentication server. More specifically, the authentication processing unit 550 transmits an authentication information request to the remote control apparatus 100 in response to the authentication request transmitted from the remote control apparatus 100. The authentication processing unit 550 receives the certificate of the remote control apparatus 100 from the remote control apparatus 100 as authentication information of the remote control apparatus 100, and performs the authentication of the remote control apparatus 100. If the authentication of the remote control apparatus 100 is successfully completed, the authentication processing unit 550 transmits to the remote control apparatus 100 information about a common key used for encrypted communication between the remote control apparatus 100 and the home server 400. Thus, the authentication processing unit 550 performs the authentication of the remote control apparatus 100. In the above-described example, a case has been described in which only the authentication of the remote control apparatus 100 is performed. However, the authentication of both of the remote control apparatus 100 and the home server 400 may be performed. For example, the authentication processing unit 550 receives a list of available encryption and compression algorithms from the remote control apparatus 100 as the authentication request, and transmits to the remote control apparatus 100 a list of encryption and compression algorithms available in the home server 400, the certificate of the home server 400, and the authentication information request. The authentication processing unit 550 acquires from the remote control apparatus 100 information used for the generation of a common key and the signature of the remote control apparatus 100. Using the acquired information, the authentication processing unit 550 generates a common key. Using the signature of the remote control apparatus 100, the authentication processing unit 550 performs the authentication of the remote control apparatus 100. Instead of the above-described authentication method, another authentication method of encrypting data such as a time code using a character string or a common key set in advance and performing authentication using the encrypted data may be used.

If the authentication of the remote control apparatus 100 is successfully completed, the authentication processing unit 550 receives a power-on request packet from the remote control apparatus 100, extracts an encrypted message from the power-on request packet, decodes the encrypted message, and supplies the decoded message to the power-on instruction unit 560. The authentication processing unit 550 receives a power-on completion message indicating that power-on processing has been completed from the power-on instruction unit 560, encrypts the power-on completion message using the common key, and supplies the encrypted power-on completion message to the IP packet response unit 530.

If a message received from the authentication processing unit 550 is a power-on request message, the power-on instruction unit 560 instructs the power supply unit 610 to turn the power on. The power-on instruction unit 560 receives a power-on completion notification from the power supply unit 610, generates a power-on completion message indicating that power-on processing has been completed, and supplies the power-on completion message to the authentication processing unit 550.

The power supply unit 610 supplies power to the data processing unit 620 in the normal mode, and supplies no power to the data processing unit 620 in the standby mode. The power supply unit 610 supplies power to the power supply unit 610 in accordance with a power-on instruction transmitted from the power-on instruction unit 560.

The data processing unit 620 performs predetermined data processing. For example, the data processing unit 620 receives a packet from the IP packet response unit 530 and performs the predetermined data processing. The data processing unit 620 may directly receive a packet from the network interface 510.

The home server 400 changes the power supply state from the standby mode to the normal mode in accordance with a power-on request. If there is no access to the data processing unit 620 in the normal mode for a certain period of time, the normal mode may be changed to the standby mode.

Figures 3A, 3B, 3C:
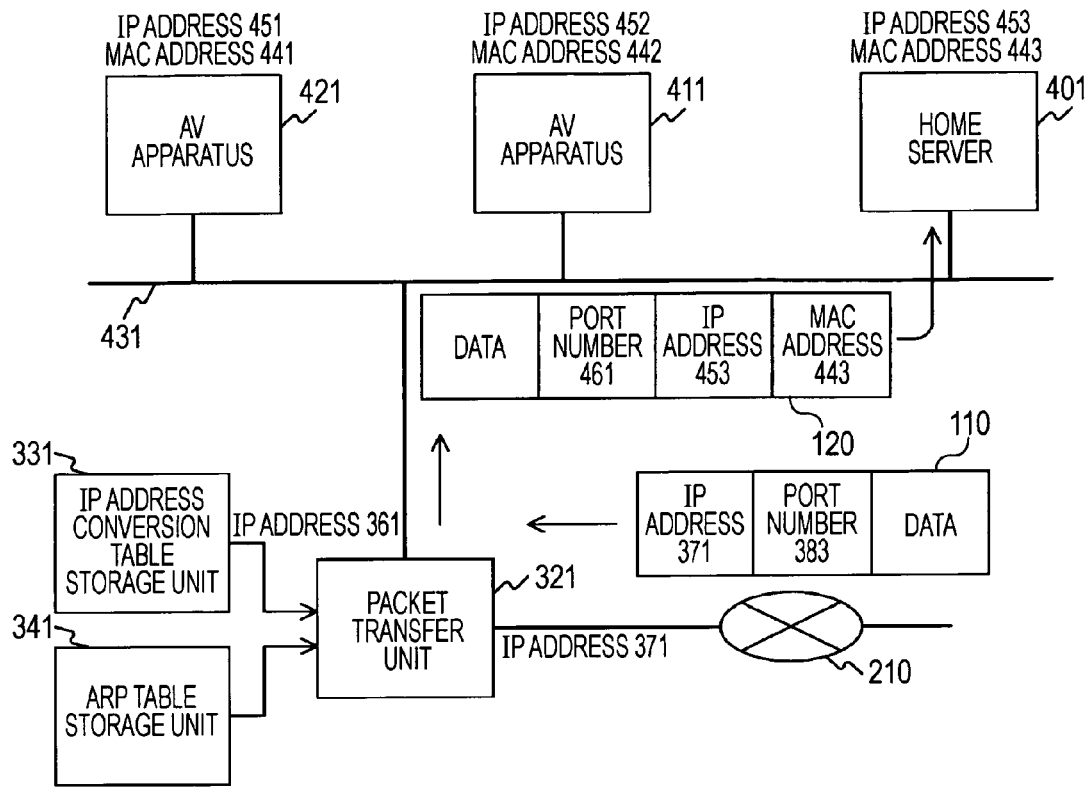
FIGS. 3A to 3C are diagrams illustrating the concept of port forwarding.

FIGS. 3A to 3C are diagrams illustrating the concept of port forwarding. FIG. 3A is a diagram illustrating an exemplary port forwarding setting achieving the access to a home server 401 via the Internet 210. FIG. 3B is a diagram illustrating an exemplary relationship that is stored in an IP address conversion table storage unit 331 in the setting of port forwarding. Referring to FIG. 3B, the destination IP address and the port number of a packet on an Internet side 332 and the destination IP address and the port number of a packet on a terminal side 333 are associated with each other. For example, in a relationship 334, a case is illustrated in which an IP address 371 and a port number 381 of a packet on the side of the Internet 210 are converted into an IP address 451 and a port number 461 of an AV apparatus 421. FIG. 3C is a diagram illustrating an exemplary relationship stored in an ARP table storage unit 341. Referring to FIG. 3C, the relationship between an IP address and a MAC address of each of a home server 401, an AV apparatus 411, and the AV apparatus 421 is illustrated. For example, in a relationship 344, a MAC address 441 and an IP address 451 of the AV apparatus 421 are associated with each other.

Referring to FIG. 3A, the home server 401, the AV apparatuses 411 and 421, IP addresses 451 to 453, MAC addresses 441 to 443, a packet transfer unit 321, the IP address conversion table storage unit 331, the ARP table storage unit 341, the Internet 210, packets 110 and 120, and a LAN 431 are illustrated. A case is illustrated in which the packet transfer unit 321 for which the setting of port forwarding is performed receives the packet 110 transmitted via the Internet 210, converts the packet 110 into the packet 120, and transfers the packet 120 to the home server 401 on the LAN 431.

First, the packet 110 is transmitted to the packet transfer unit 321 via the Internet 210. The destination IP address of the packet 110 is set to the IP address 371 of the packet transfer unit 321 on the side of the Internet 210. The packet transfer unit 321 acquires the IP address 453 and the port number 461 on the terminal side 333 corresponding to the port number 383 of the packet 110 using a relationship 336 illustrated in FIG. 3B, and converts the destination of the packet 110 using the IP address 453 and the port number 461. Thus, by performing the setting of port forwarding, the destination IP address and the port number of a packet transmitted via the Internet 210 can be converted into the IP address and the port number of a specific terminal on the side of the LAN 431. Furthermore, the packet transfer unit 321 acquires the MAC address 443 corresponding to the IP address 453 using a relationship 354 illustrated in FIG. 3C.

Thus, the packet transfer unit 321 converts the destination IP address and the port number of the packet 110 into the IP address and the port number of the home server 401 and acquires the MAC address of the home server 401 so as to generate the packet 120. Consequently, the packet transfer unit 321 can transfer a packet transmitted via the Internet 210 to the home server 401. An exemplary case has been described in which the packet transfer unit 321 acquires information stored in the ARP table storage unit 341. However, the router 310 periodically erases the information stored in the ARP table storage unit 341. Next, a method of acquiring a MAC address corresponding to an IP address using an ARP packet will be described with reference to FIG. 4.

Figure 4:
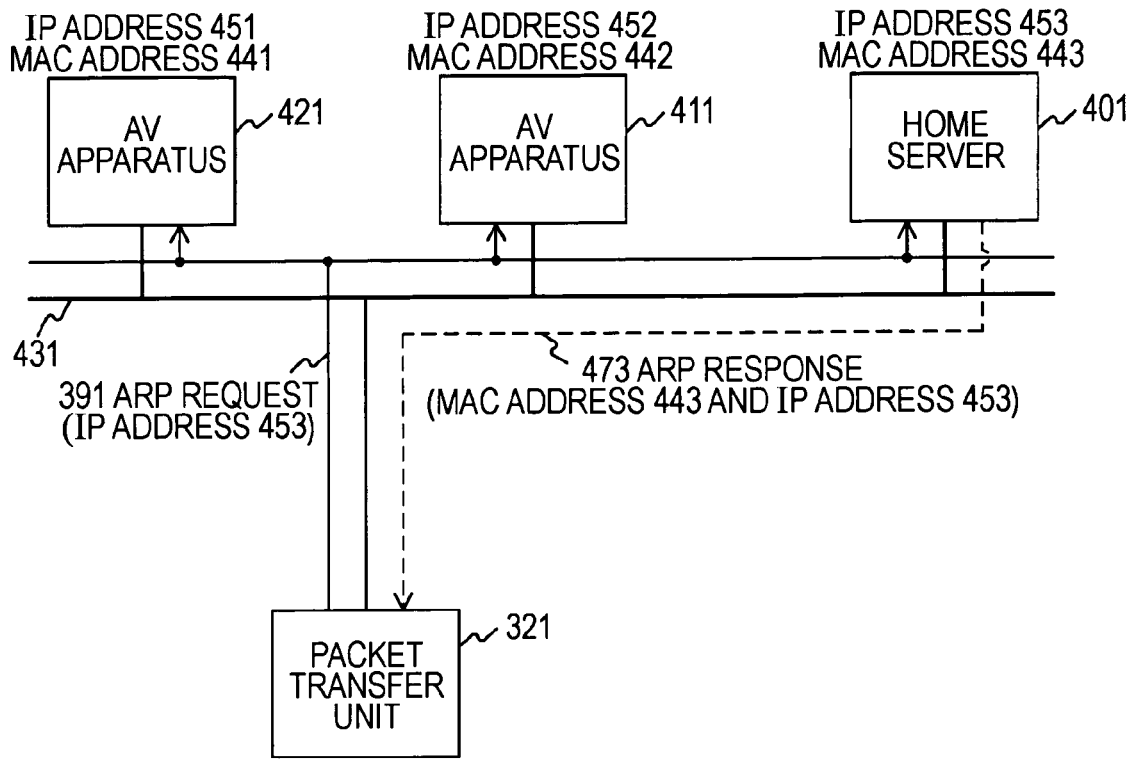
FIG. 4 is a diagram illustrating the concept of the acquisition of a MAC address using an ARP packet.

FIG. 4 is a diagram illustrating the concept of the acquisition of a MAC address using an ARP packet. As in the case illustrated in FIG. 3A, the home server 401, the AV apparatuses 411 and 421, the IP addresses 451 to 453, the MAC addresses 441 to 443, the packet transfer unit 321, and the LAN 431 are illustrated. As an ARP packet flow, an ARP request 391 and an ARP response 473 are illustrated. The process of acquiring a MAC address using an ARP packet when information stored in the ARP table storage unit 341 is erased is illustrated. First, the packet transfer unit 321 broadcasts an inquiry to all terminals on the LAN 431, for example, the home server 401, using the ARP request 391 including the IP address 453 so as to acquire the MAC address 443 corresponding to the IP address 453. The home server 401 to which the IP address 453 is assigned transmits the ARP response 473 including the relationship between the MAC address 443 and the IP address 453 of the home server 401 to the packet transfer unit 321 in response to the ARP request 391. Thus, the packet transfer unit 321 can acquire the MAC address 443 corresponding to the IP address 453 using the ARP packet. As described previously, when information stored in the ARP table storage unit 341 is erased, in order to transfer a packet, which has been transmitted via the Internet, from the packet transfer unit 321 to a terminal on the LAN 431, it is necessary for the terminal on the LAN 431, for example, the home server 401, to transmit an ARP response packet in response to an ARP request packet transmitted from the packet transfer unit 321. In an embodiment of the present invention, the home server 400 in the standby mode responds to an ARP request packet using the IP packet response unit 530. Next, a protocol stack in the home server 400 in the standby mode will be described with reference to FIGS. 5A and 5B.

Figure 5A:
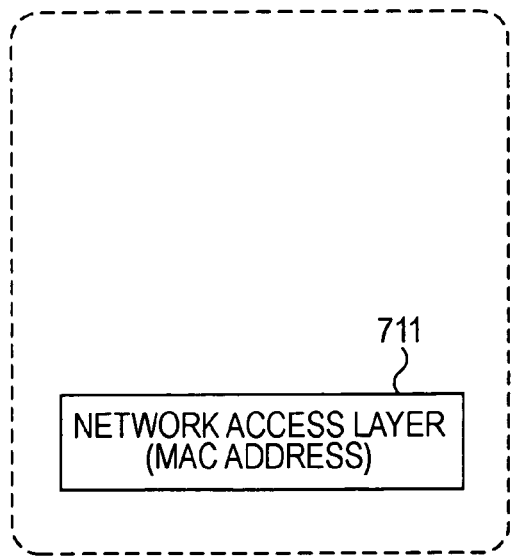
FIGS. 5A and 5B are diagrams describing a communication, protocol stack in a home server in a standby mode according to an embodiment of the present invention.
Figure 5B:
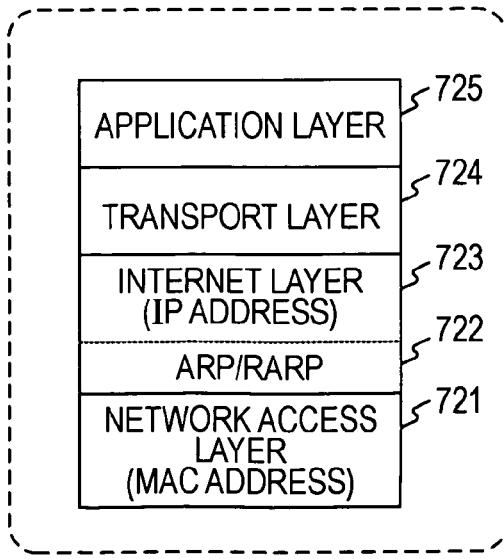

FIGS. 5A and 5B are diagrams describing a communication protocol stack in the home server 400 in a standby mode according to an embodiment of the present invention. FIG. 5A is a diagram illustrating a communication protocol layer operating in a standby mode in the related art. FIG. 5B is a diagram illustrating communication protocol layers processed by the home server 400 in a standby mode according to an embodiment of the present invention. FIG. 5A illustrates a network access layer 711. The protocol of the network access layer 711 has a role in transmitting a packet to a destination, for example, setting a destination MAC address for the header portion of a frame and transmitting a packet to a destination. In the above-described related art, using the header portion of the frame, the authentication of an apparatus and the exchange of information about a request to turn on a target apparatus are performed.

On the other hand, in an embodiment of the present invention, as illustrated in FIG. 5B, the protocols of communication protocol layers (an Internet layer 723, a transport layer 724, and an application layer 725) higher than the network access layer 721 are used. In order to reduce the power consumption in the standby mode of the home server 400, the home server 400 operates only a minimum number of necessary protocols of the high-level communication protocol layers. For example, the IP packet response unit 530 operates only ARP included in an ARP/RARP (Reverse Address Resolution Protocol) 722 illustrated as the protocol of the Internet layer 723. As illustrated in FIG. 4, using ARP, an ARP response packet can be transmitted in response to an ARP request packet. The authentication processing unit 550 and the power-on instruction unit 560 perform processing for authenticating the remote control apparatus 100 and processing for responding to a power-on request, respectively, using only HTTP (Hyper Text Transfer Protocol) that is one of protocols of the application layer 725. Since HTTP is used for the processing for authenticating the remote control apparatus 100 and the processing for responding to a power-on request, the authentication processing unit 550 uses a minimum number of necessary protocols of the transport layer 724 so as to pass data between the application layer 725 and the Internet layer 723. For example, TCP (Transmission Control Protocol) is used.

Thus, in an embodiment of the present invention, in the home server 400 in the standby mode, processing for responding to an ARP request packet transmitted from the router 310, processing for authenticating the remote control apparatus 100, and processing for responding to a power-on request are performed using communication protocols of communication protocol layers higher than the network access layer 721. In order to reduce the power consumption of the home server 400 in the standby mode, a minimum number of necessary communication protocols of communication protocol layers higher than the network access layer 721 are used.

In this example, authentication processing and processing for responding to a power-on request are performed using HTTP. However, another protocol of a communication protocol layer higher than the network access layer 721 may be used. In this example, the authentication processing and the processing for responding to a power-on request are performed using the same communication protocol. However, the protocols of different communication protocol layers may be used. In this example, under the assumption about the connection to the router 310, only ARP is used. However, RARP may be used. ARP is a protocol used to acquire a MAC address corresponding to an IP address, and RARP is a protocol used to acquire an IP address corresponding to a MAC address.

Figures 6, 7A, 7B:
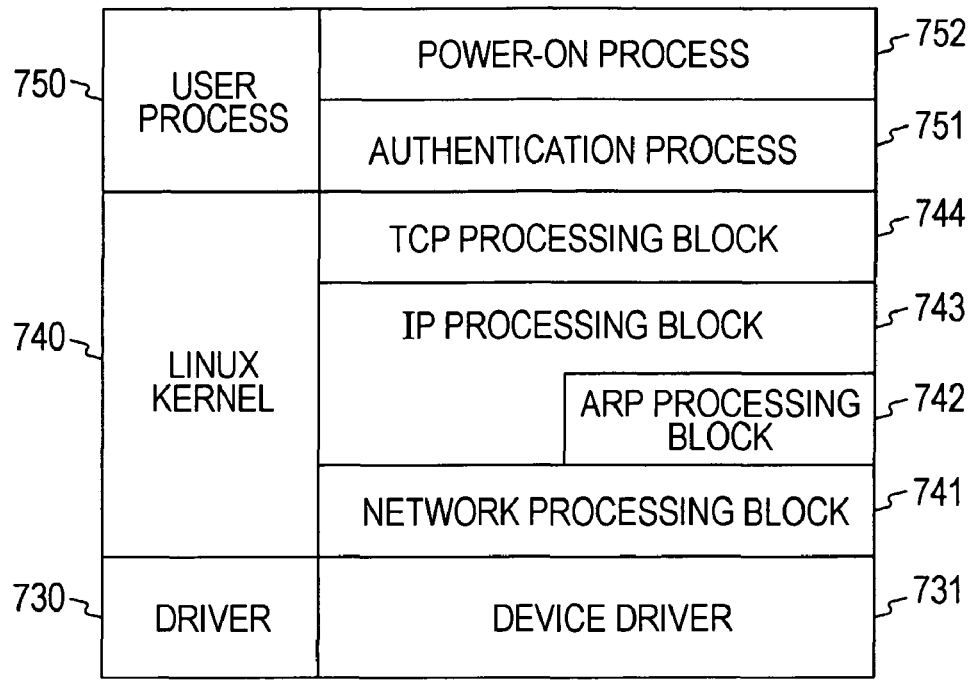
FIG. 6 is a diagram illustrating an example of Linux implementation in a home server in a standby mode according to an embodiment of the present invention.
FIGS. 7A and 7B are diagrams illustrating exemplary HTTP power-on messages according to an embodiment of the present invention.

FIG. 6 is a diagram illustrating an example of Linux implementation in the home server 400 in a standby mode according to an embodiment of the present invention. Referring to FIG. 6, a driver 730 prepared for each type of an operating system (hereinafter referred to as an OS), a Linux kernel 740 that is the central component of Linux, and a user process 750 performed by the authority of a user are illustrated. As the driver 730, a device driver 731 for Linux that is an OS is prepared. As the Linux kernel 740, four processing blocks, that is, a network processing block 741, an ARP processing block 742, an IP processing block 743, and a TCP processing block 744 are implemented. In the network processing block 741, the ARP processing block 742, the IP processing block 743, and the TCP processing block 744, processing operations of the network access layer 721, the ARP/RARP 722, the Internet layer 723, and the transport layer 724 are performed, respectively. As the user process 750, an authentication process 751 and a power-on process 752 are implemented. The power-on process 752 is a process in which the power-on instruction unit 560 receives a power-on request message and transmits a power-on completion message. Thus, by reducing the number of functions of the home server 400 in the standby mode to the minimum necessary, the power consumption of the home server 400 in the standby mode can be reduced.

This example of Linux implementation has been described by way of example. The present invention is not limited thereto. Another configuration on Linux or a configuration on another OS such as Unix (registered trademark), Windows (registered trademark), or Symbian (registered trademark) may be used. The present invention may not necessarily be achieved by software. A part of the above-described functions may be implemented on a piece of hardware. That is, using another module or component having functions of the network processing, the ARP processing, the IP processing, the TCP processing, the authentication process, and the power-on process, an embodiment of the present invention can also be achieved. The authentication process and the power-on process are performed in a communication protocol layer higher than the network access layer 721.

FIGS. 7A and 7B are diagrams illustrating exemplary HTTP power-on messages according to an embodiment of the present invention. FIG. 7A illustrates an example of a power-on request message transmitted from the remote control apparatus 100. Referring to FIG. 7A, a first line is a request line including a method (POST) representing the content of a request, the content of the request (power_on), and the version of HTTP (HTTP/1.1). The content of the request (power_on) represents a request for power-on processing. The content of the request (power_on) is transmitted to the home server 400 using the method called POST. In a second line, the name of a server (Host:homesever.myhome.chomechome.com) to which the request is transmitted is illustrated. The power-on instruction unit 560 receives the power-on request message and instructs the power supply unit 610 to turn the power on. The power-on request message is encrypted by the remote control apparatus 100 using a common key. The encrypted power-on request message is transmitted to the home server 400, and is then decoded by the authentication processing unit 550.

FIG. 7B illustrates an example of a power-on completion message generated by the power-on instruction unit 560. Referring to FIG. 7B, a first line is a status line including the version of HTTP (HTTP/1.1), a status number (200), and the content of the status (OK). The status number (200) and the content of the status (OK) represent the completion of power-on processing. In the second line, the date and time (Date: Wed, 19 Mar. 2005 19:45:00 JST) of the completion of the power-on processing is illustrated. The power-on completion message is supplied from the power-on instruction unit 560 to the authentication processing unit 550, encrypted by the authentication processing unit 550 using a common key, and is then transmitted to the remote control apparatus 100.

Thus, the power-on instruction unit 560 receives a power-on request that is an HTTP message from the remote control apparatus 100, and transmits a power-on completion notification to the remote control apparatus 100 after the power has been turned on.

The operation of the home server 400 according to an embodiment of the present invention will be described with reference to the accompanying drawings.

Figure 8:
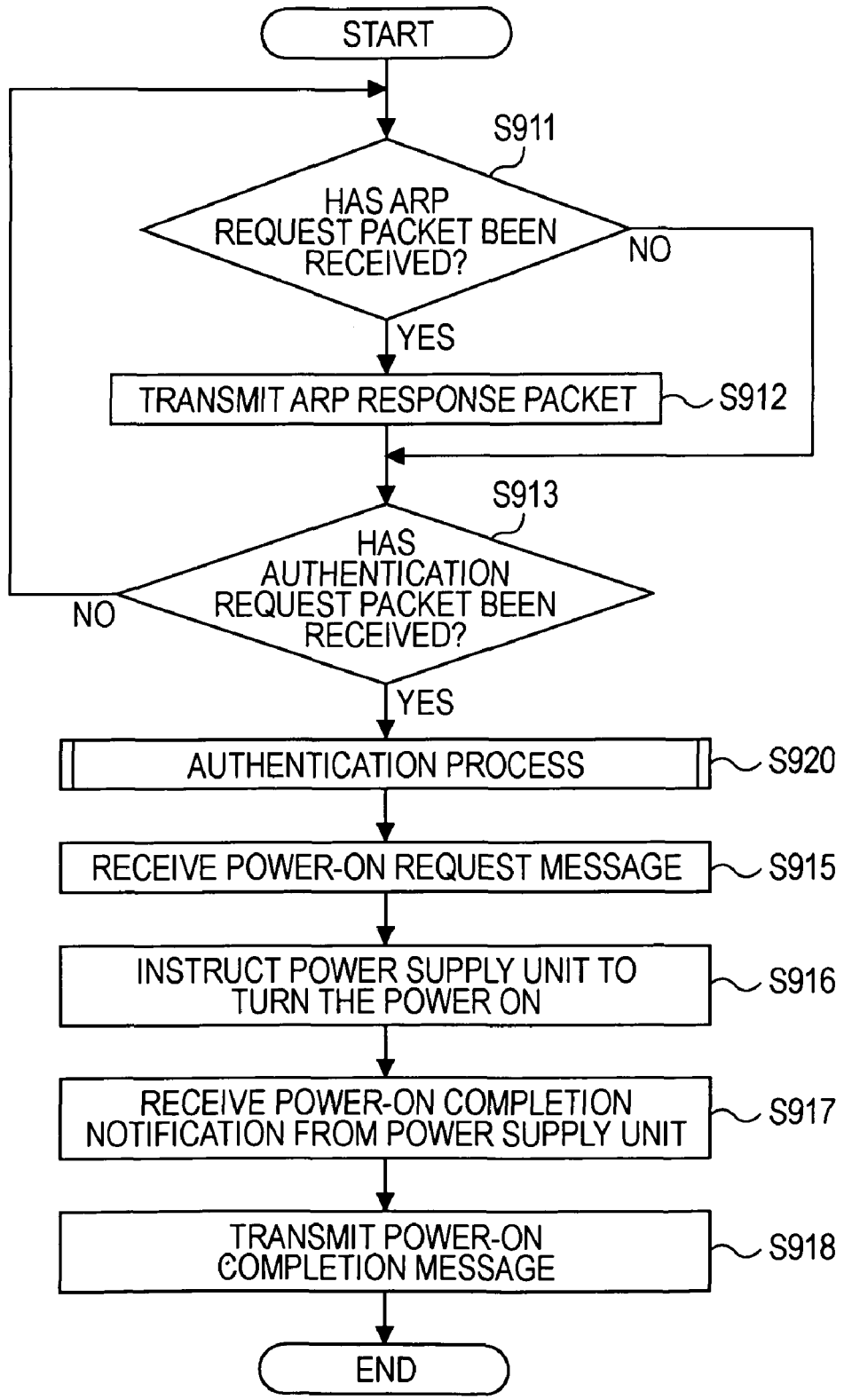
FIG. 8 is a flowchart illustrating an exemplary power-on process performed by a power-on control section according to an embodiment of the present invention.

FIG. 8 is a flowchart illustrating an exemplary power-on process performed by the power-on control section 500 according to an embodiment of the present invention.

First, the IP packet response unit 530 determines whether a packet received from the network interface 510 is an ARP request packet (step S911). If the received packet is an ARP request packet, the IP packet response unit 530 transmits an ARP response packet to the router 310 (step S912).

On the other hand, if the received packet is not an ARP request packet, the authentication processing unit 550 determines whether a packet received from the IP packet response unit 530 is an authentication request packet (step S913). If the received packet is not an authentication request packet, the process returns to step S911. If the received packet is an authentication request packet, the authentication processing unit 550 performs an authentication process of authenticating the remote control apparatus 100 (step S920). Furthermore, the authentication processing unit 550 decodes an encrypted message transmitted from the authenticated remote control apparatus 100 using a common key, and transmits the decoded message to the power-on instruction unit 560. Subsequently, the power-on instruction unit 560 receives from the authentication processing unit 550 the power-on request message transmitted from the remote control apparatus 100 (step S915). On the basis of the power-on request message, the power-on instruction unit 560 instructs the power supply unit 610 to turn the power on (step S916). Subsequently, the power supply unit 610 supplies power to the data processing unit 620, and transmits a notification that the supply of power has been started to the power-on instruction unit 560 (step S917). Subsequently, the power-on instruction unit 560 generates a power-on completion message and transmits the generated power-on completion message to the remote control apparatus 100 (step S918).

On the other hand, if the packet received from the network interface 510 is not an ARP request packet in step S911, the process proceeds to step S913 in which it is determined whether the received packet is an authentication request packet.

Figure 9:
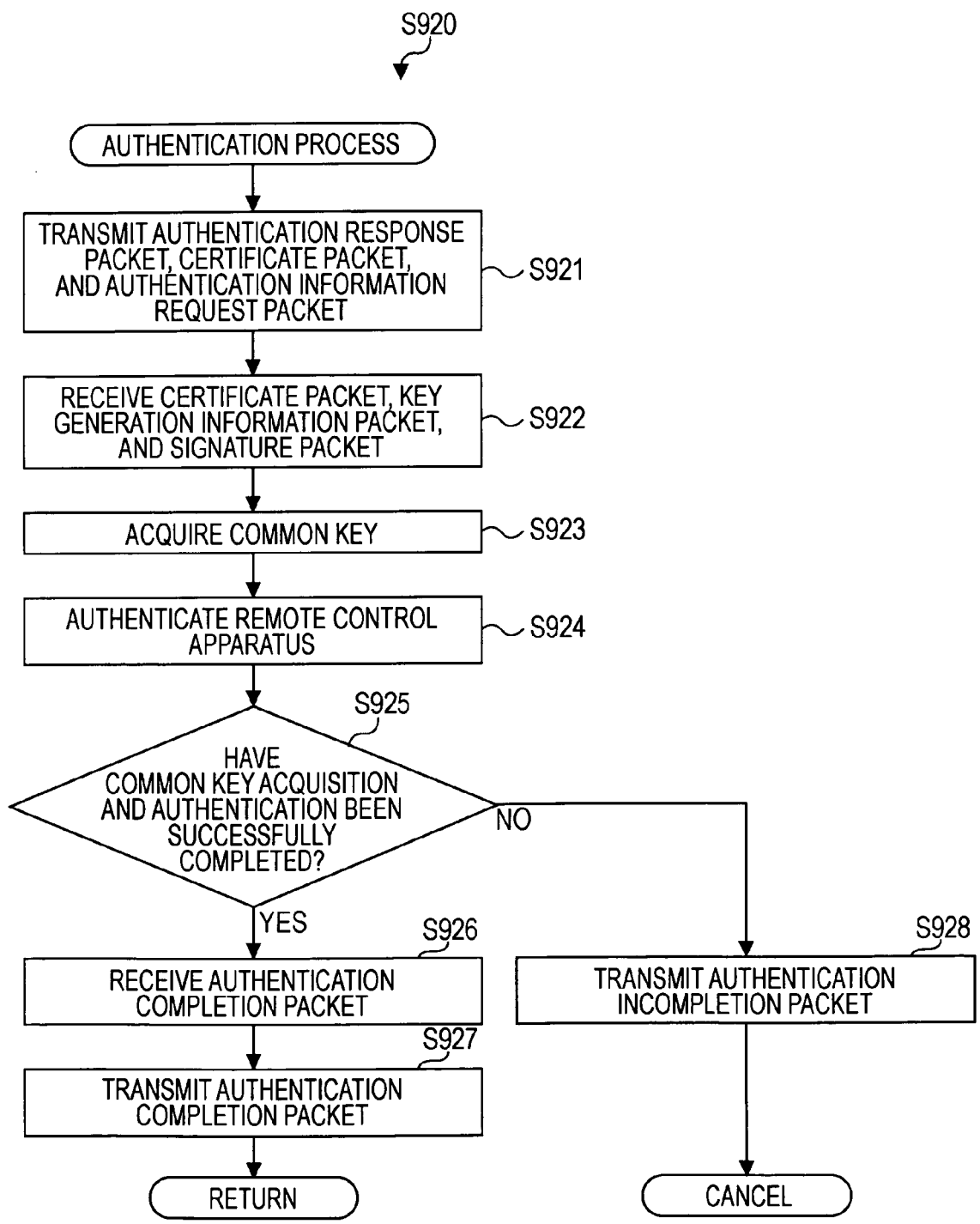
FIG. 9 is a flowchart illustrating an exemplary authentication process performed by an authentication processing unit according to an embodiment of the present invention.

FIG. 9 is a flowchart illustrating an exemplary authentication process (step S920) performed by the authentication processing unit 550 according to an embodiment of the present invention. An exemplary process of authenticating both of the remote control apparatus 100 and the home server 400 will be described.

First, after receiving a list of encryption and compression algorithms available as an authentication request transmitted from the remote control apparatus 100 (step S913), the authentication processing unit 550 transmits a list of encryption and compression algorithms available in the home server 400, the certificate of the home server 400, and a request for the transmission of the authentication information of the remote control apparatus 100 to the remote control apparatus 100 (step S921). The authentication processing unit 550 receives information used to generate a common key and a signature from the remote control apparatus 100 (step S922). The authentication processing unit 550 generates a common key using the received information (step S923), and performs the authentication of the remote control apparatus 100 on the basis of the signature (step S924). The authentication processing unit 550 determines whether the acquisition of a common key and the authentication of the remote control apparatus 100 have been successfully completed (step S925). If the acquisition of a common key and the authentication of the remote control apparatus 100 are successfully completed, the authentication processing unit 550 receives an authentication completion notification from the remote control apparatus 100 (step S926), and notifies the remote control apparatus 100 that the authentication of the remote control apparatus 100 has been completed (step S927). Subsequently, the process proceeds to step S915.

On the other hand, if the acquisition of a common key or the authentication of the remote control apparatus 100 fails, the authentication processing unit 550 notifies the remote control apparatus 100 that the authentication of the remote control apparatus 100 has failed (step S928). Subsequently, the process is canceled.

Figure 10:
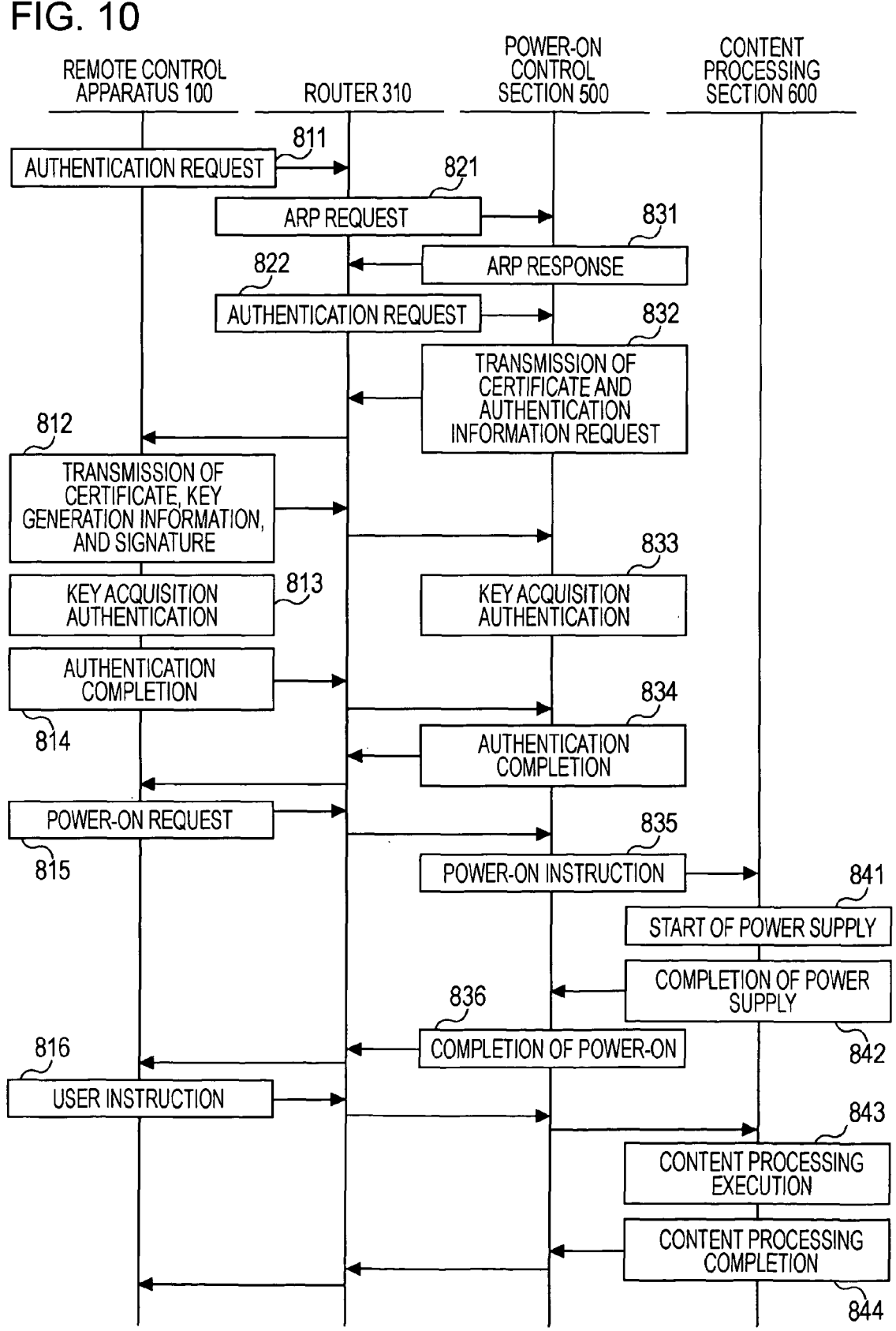
FIG. 10 is a sequence chart illustrating an exemplary power-on process performed by a home server according to an embodiment of the present invention.

FIG. 10 is a sequence chart illustrating an exemplary power-on process performed by the home server 400 according to an embodiment of the present invention. In this example, a power-on process performed in a case in which the power-on control section 500 receives an ARP request packet from the router 310 will be described.

First, an authentication request packet is transmitted from the remote control apparatus 100 to the home server 400 (811). The router 310 converts the destination IP address and the port number of the authentication request packet into the IP address and the port number of the home server 400 by performing the setting of port forwarding. Since information stored in the ARP table storage unit 340 is erased, an ARP request packet inquiring about the MAC address of the home server 400 is broadcasted (821). The power-on control section 500 transmits to the router 310 an ARP response packet storing the relationship between the MAC address and the IP address of the home server 400 in response to the ARP request packet (831).

The router 310 sets the MAC address of the home server 400 as the destination MAC address of the authentication request packet, and transfers the authentication request packet to the home server 400 (822). The power-on control section 500 transmits a list of encryption and compression algorithms available in the home server 400, the certificate of the home server 400, and a request for the transmission of authentication information of the remote control apparatus 100 to the remote control apparatus 100 (832).

On the basis of the list, the certificate, and the request for the transmission of authentication information which have been transmitted from the power-on control section 500, the remote control apparatus 100 transmits the certificate thereof, information used to generate a common key, and a signature thereof to the power-on control section 500 (812). The remote control apparatus 100 generates a common key and authenticates the home server 400 (813). The remote control apparatus 100 transmits an authentication completion notification packet to the power-on control section 500 (814).

On the other hand, the power-on control section 500 generates a common key and authenticates the remote control apparatus 100 on the basis of the certificate of the remote control apparatus 100, the information used to generate a common key, and the signature of the remote control apparatus 100 which have been transmitted from the remote control apparatus 100 (833). Furthermore, the power-on control section 500 receives the authentication completion notification packet from the remote control apparatus 100, and transmits a packet notifying the remote control apparatus 100 that the authentication of the remote control apparatus 100 has been completed to the remote control apparatus 100 (834).

The remote control apparatus 100 transmits a power-on request packet to the power-on control section 500 (815). On the basis of the power-on request packet, the power-on control section 500 instructs the content processing section 600 to turn the power on (835). The content processing section 600 starts to supply power in accordance with the instruction transmitted from the power-on control section 500 (841), and notifies the power-on control section 500 that the supply of power has been started (842). The power-on control section 500 transmits a power-on completion packet to the remote control apparatus 100 on the basis of the notification that the supply of power has been started which has been received from the content processing section 600 (836).

The remote control apparatus 100 transmits to the content processing section 600 a packet used to perform predetermined control processing for the content processing section 600 (816). On the basis of the packet, the content processing section 600 performs predetermined content processing (843), and transmits a content processing completion notification packet to the remote control apparatus 100 after the completion of the predetermined content processing (844).

Figure 11:
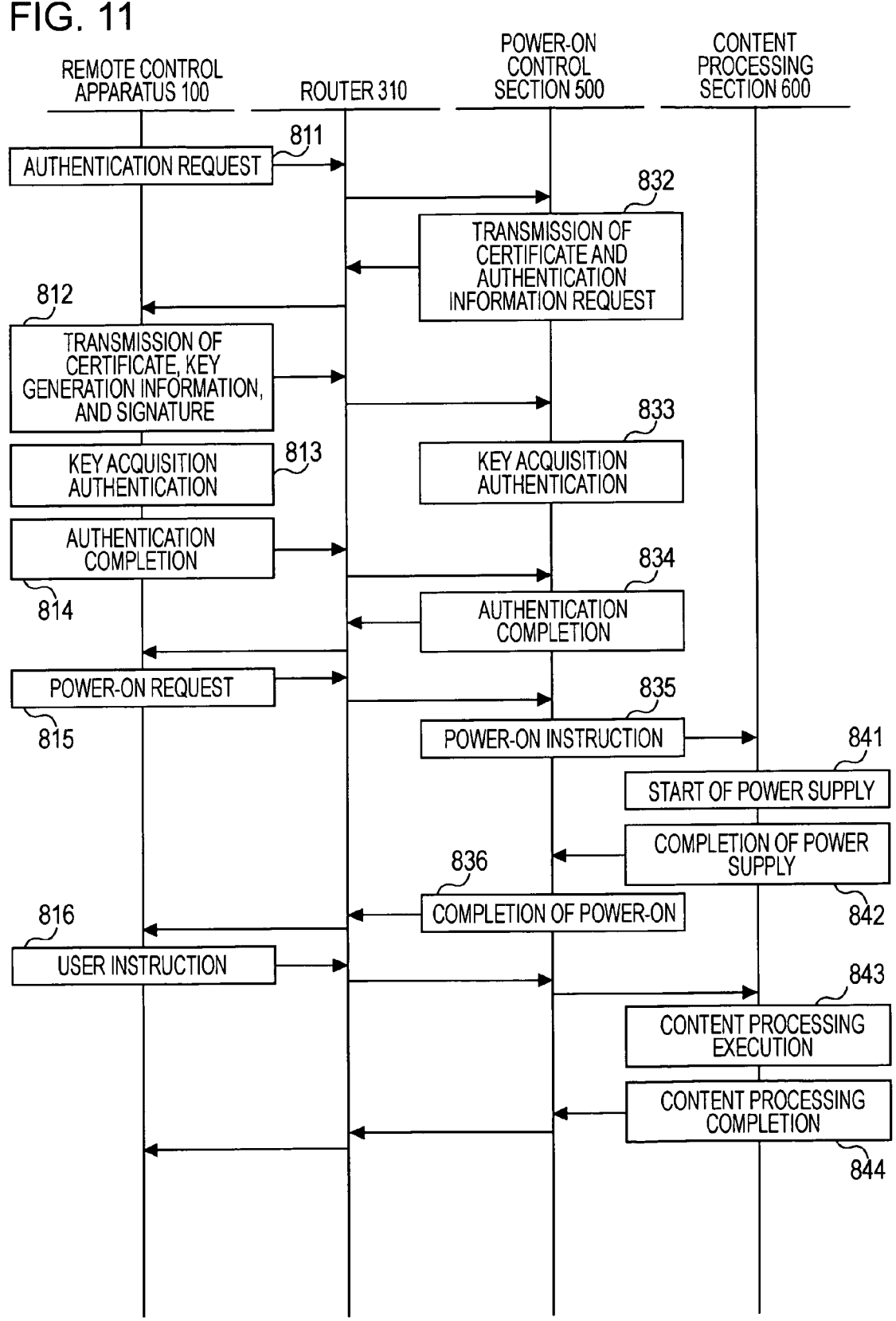
FIG. 11 is a sequence chart illustrating an exemplary power-on process performed by a home server according to an embodiment of the present invention.

FIG. 11 is a sequence chart illustrating an exemplary power-on process performed by the home server 400 according to an embodiment of the present invention. A power-on process performed in a case in which the relationship between the IP address and the MAC address of the home server 400 is stored in the ARP table storage unit 340 included in the router 310 will be described. In this example, the MAC address of the home server 400 is acquired using information stored in the ARP table storage unit 340 included in the router 310. Accordingly, the process illustrated in FIG. 11 is the same as that illustrated in FIG. 10 except for the process of acquiring the MAC address of the home server 400 using an ARP packet (821, 822, and 831) illustrated in FIG. 10. Accordingly, the same reference numerals are used to identify processing operations already described with reference to FIG. 10, and the description thereof will be omitted.

Figure 12:
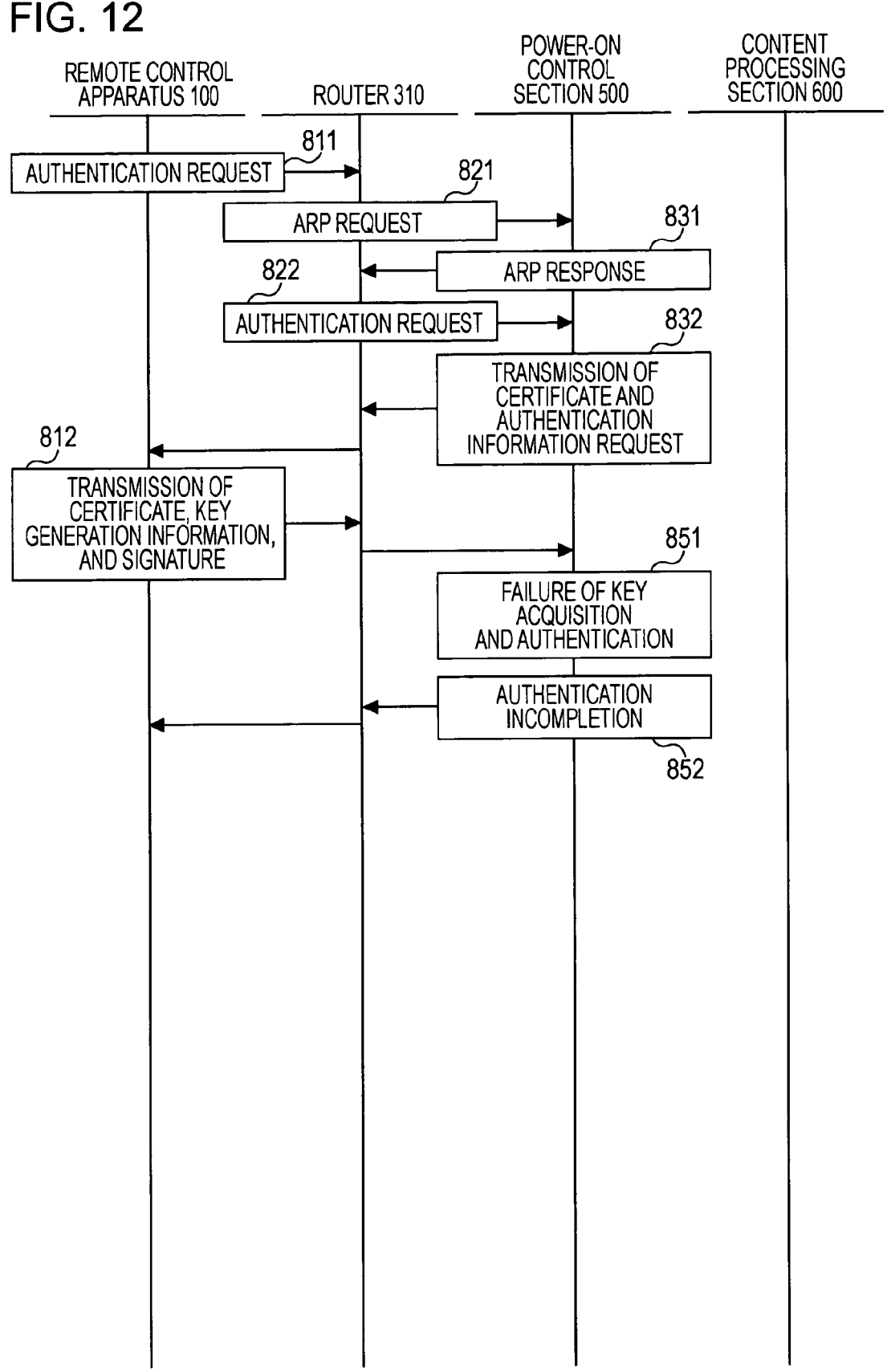
FIG. 12 is a sequence chart illustrating an exemplary power-on process performed by a home server according to an embodiment of the present invention.

FIG. 12 is a sequence chart illustrating an exemplary power-on process performed by the home server 400 according to an embodiment of the present invention. In this example, a power-on process performed in a case in which the authentication of the remote control apparatus 100 fails will be described.

First, the remote control apparatus 100 transmits an authentication request packet to the home server 400 (811). The router 310 converts the destination IP address and the port number of the authentication request packet into the IP address and the port number of the home server 400 by performing the setting of port forwarding. Since information stored in the ARP table storage unit 340 is erased, an ARP request packet inquiring about the MAC address of the home server 400 is broadcasted (821). The power-on control section 500 transmits to the router 310 an ARP response packet storing the relationship between the MAC address and the IP address of the home server 400 in response to the ARP request packet (831).

The router 310 sets the MAC address of the home server 400 as the destination MAC address of the authentication request packet, and transfers the authentication request packet to the home server 400 (822). Subsequently, the power-on control section 500 transmits a list of encryption and compression algorithms available in the home server 400, the certificate of the home server 400, and a request for the transmission of authentication information of the remote control apparatus 100 to the remote control apparatus 100 (832). The power-on control section 500 fails to generate a common key or authenticate the remote control apparatus 100 on the basis of the certificate of the remote control apparatus 100, the information used to generate a common key, and the signature of the remote control apparatus 100 which have been transmitted from the remote control apparatus 100 (851). The power-on control section 500 transmits an authentication incompletion notification packet to the remote control apparatus 100 (852). The power-on process is canceled.

Thus, according to an embodiment of the present invention, by using communication protocols of communication protocol layers higher than the network access layer 721 in the home server 400 in the standby mode, processing for responding to an ARP request packet transmitted from the router 310, processing for authenticating the remote control apparatus 100, and power-on processing can be performed. Consequently, the home server 400 in the standby mode can supply power to the data processing unit 620 in response to a request transmitted from the remote control apparatus 100 with more certainty.

In an embodiment of the present invention, a case has been described in which the home server 400 in the standby mode supplies power to the data processing unit 620 in response to a power-on request transmitted from the remote control apparatus 100 (the operation mode of the home server 400 is changed from the standby mode to the normal mode). However, a case can be considered in which the home server 400 in the normal mode stops the supply of power to the data processing unit 620 in response to a power-off request transmitted from the remote control apparatus 100 (the operation mode of the home server 400 is changed from the normal mode to the standby mode).

An embodiment of the present invention has been described by way of example. The correspondence between the features of the claims and the specific elements disclosed in an embodiment of the present invention will be described below. It is obvious that various modifications of an embodiment can be made without departing from the spirit and scope of the present invention.

Mode switching control means corresponds to, for example, the power-on control section 500. Data processing means corresponds to, for example, the data processing unit 620. A power supply circuit corresponds to, for example, the power supply unit 610.

Authentication processing means corresponds to, for example, the authentication processing unit 550.

First address storing means corresponds to, for example, the MAC address storage unit 520. Second address storing means corresponds to, for example, the IP address storage unit 540. Packet responding means corresponds to, for example, the IP packet response unit 530.

An information processing apparatus corresponds to, for example, the home server 400. A path control apparatus corresponds to, for example, the router 310. Mode switching control means corresponds to, for example, the power-on control section 500.

Receiving a mode switching request corresponds to, for example, steps S911, S912, S913, S920, and S915. Instructing the power supply circuit to switch between the first operation mode and the second operation mode corresponds to, for example, steps S916, S917, and S918.

The processing flows described in an embodiment of the present invention may be considered as a method having a series of these processing flows, a program causing a computer to perform the series of these processing flows, or a recording medium storing the program.

What is claimed is:

1. An information processing apparatus comprising:
    data processing means for performing predetermined data processing;
    a power supply circuit having a first operation mode in which power is supplied to the data processing means and a second operation mode in which no power is supplied to the data processing means; and
    mode switching control means for, upon receiving a mode switching request from an apparatus on a network via a communication protocol of a communication protocol layer higher than the network access layer, instructing the power supply circuit to switch between the first operation mode and the second operation mode in response to the mode switching request,
    wherein the mode switching control means includes,
    first address storing means for storing a first address that is unique address information for the information processing apparatus,
    second address storing means for storing a second address that is network address information of the information processing apparatus, and
    packet responding means for, upon receiving a packet for inquiry about the first address in a case that the power supply circuit is in the second operation mode, transmitting a response packet storing a relationship between the first address and the second address to an apparatus from which the packet has been transmitted.

2. The information processing apparatus according to claim 1, wherein the mode switching control means includes authentication processing means for, upon receiving an authentication request from the apparatus on the network via the communication protocol of the communication protocol layer higher than the network access layer in a case that the power supply circuit is in the second operation mode, performing authentication of the apparatus.

3. The information processing apparatus according to claim 1, wherein the first address is a MAC address, and the second address is an IP address.

4. An information processing system comprising:
    an information processing apparatus; and
    a path control apparatus,
    the information processing apparatus including,
    data processing means for performing predetermined data processing,
    a power supply circuit having a first operation mode in which power is supplied to the data processing means and a second operation mode in which no power is supplied to the data processing means, and
    mode switching control means for, upon receiving a mode switching request from an apparatus on a network via a communication protocol of a communication protocol layer higher than the network access layer, instructing the power supply circuit to switch between the first operation mode and the second operation mode in response to the mode switching request,
    the path control apparatus being an apparatus for transferring a packet for the mode switching request to the information processing apparatus, and
    wherein the path control apparatus transmits a packet for inquiry about unique address information for the information processing apparatus, and
    wherein, in a case that the power supply circuit is in the second operation mode, upon receiving the packet for inquiry about unique address information for the information processing apparatus, the mode switching control means transmits to the path control apparatus the unique address information for the information processing apparatus.

5. A mode switching method for an information processing apparatus that includes data processing means for performing predetermined data processing and a power supply circuit having a first operation mode in which power is supplied to the data processing means and a second operation mode in which no power is supplied to the data processing means, the mode switching method comprising the steps of:
    receiving a mode switching request from an apparatus on a network via a communication protocol of a communication protocol layer higher than the network access layer; and
    instructing the power supply circuit to switch between the first operation mode and the second operation mode in response to the mode switching request,
    and further comprising:
    storing a first address that is unique address information for the information processing apparatus,
    storing a second address that is network address information of the information processing apparatus, and
    upon receiving a packet for inquiry about the first address in a case that the power supply circuit is in the second operation mode, transmitting a response packet storing a relationship between the first address and the second address to an apparatus from which the packet has been transmitted.

6. A computer readable recording medium having stored thereon a program causing a computer to execute, in an information processing apparatus that includes data processing means for performing predetermined data processing and a power supply circuit having a first operation mode in which power is supplied to the data processing means and a second operation mode in which no power is supplied to the data processing means, the steps of:
    receiving a mode switching request from an apparatus on a network via a communication protocol of a communication protocol layer higher than the network access layer; and
    instructing the power supply circuit to switch between the first operation mode and the second operation mode in response to the mode switching request,
    and further comprising:
    storing a first address that is unique address information for the information processing apparatus,
    storing a second address that is network address information of the information processing apparatus, and
    upon receiving a packet for inquiry about the first address in a case that the power supply circuit is in the second operation mode, transmitting a response packet storing a relationship between the first address and the second address to an apparatus from which the packet has been transmitted.

7. An information processing apparatus comprising:
    a data processing unit configured to perform predetermined data processing;
    a power supply circuit having a first operation mode in which power is supplied to the data processing unit and a second operation mode in which no power is supplied to the data processing unit; and a mode switching control unit configured to, upon receiving a mode switching request from an apparatus on a network via a communication protocol of a communication protocol layer higher than the network access layer, instruct the power supply circuit to switch between the first operation mode and the second operation mode in response to the mode switching request, wherein the mode switching control unit includes, a first address storing unit configured to store a first address that is unique address information for the information processing apparatus, a second address storing unit configured to store a second address that is network address information of the information processing apparatus, and a packet responding unit configured to, upon receiving a packet for inquiry about the first address in a case that the power supply circuit is in the second operation mode, transmit a response packet storing a relationship between the first address and the second address to an apparatus from which the packet has been transmitted.

8. An information processing system comprising:
an information processing apparatus; and
a path control apparatus,
the information processing apparatus including, a data processing unit configured to perform predetermined data processing, a power supply circuit having a first operation mode in which power is supplied to the data processing unit and a second operation mode in which no power is supplied to the data processing unit, and a mode switching control unit configured to, upon receiving a mode switching request from an apparatus on a network via a communication protocol of a communication protocol layer higher than the network access layer, instruct the power supply circuit to switch between the first operation mode and the second operation mode in response to the mode switching request, the path control apparatus being an apparatus for transferring a packet for the mode switching request to the information processing apparatus, and wherein the path control apparatus transmits a packet for inquiry about unique address information for the information processing apparatus, and wherein, in a case that the power supply circuit is in the second operation mode, upon receiving the packet for inquiry about unique address information for the information processing apparatus, the mode switching control unit transmits to the path control apparatus the unique address information for the information processing apparatus.

* * * * *